US012598152B2

(12) United States Patent
Tsvetkov et al.

(10) Patent No.: US 12,598,152 B2
(45) Date of Patent: Apr. 7, 2026

(54) IN-CONTEXT LEARNING WITH TEMPLATES FOR LARGE LANGUAGE MODEL GENERATION OF CUSTOMIZED EMAILS

(71) Applicant: Microsoft Technology Licensing, LLC, Redmond, WA (US)

(72) Inventors: Alexander Tsvetkov, Tel-Aviv (IL); Abedelkader Asi, Sammamish, WA (US); Roy Eisenstadt, Tel-Aviv (IL); Royi Ronen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 238 days.

(21) Appl. No.: 18/492,061

(22) Filed: Oct. 23, 2023

(65) Prior Publication Data

US 2025/0133042 A1 Apr. 24, 2025

(51) Int. Cl.

| | |
|---|---|
| ***G06F 17/00*** | (2019.01) |
| ***G06F 9/451*** | (2018.01) |
| ***G06F 40/174*** | (2020.01) |
| ***G06F 40/20*** | (2020.01) |
| ***H04L 51/063*** | (2022.01) |

(52) U.S. Cl.

CPC ............ *H04L 51/063* (2013.01); *G06F 9/451* (2018.02); *G06F 40/174* (2020.01); *G06F 40/20* (2020.01)

(58) Field of Classification Search

CPC ..... H04L 51/063; G06F 9/451; G06F 40/174; G06F 40/20; G06F 40/56; G06Q 10/107

See application file for complete search history.

(56) References Cited

U.S. PATENT DOCUMENTS 11,516,158 B1 * 11/2022 Luzhnica ............... G06N 3/045
12,386,797 B2 * 8/2025 Urdiales ............... G06F 16/215
12,444,412 B2 * 10/2025 Piskala ................. G06F 16/338
(Continued)

FOREIGN PATENT DOCUMENTS

CA 3148108 A1 8/2023
WO WO-2024071995 A1 * 4/2024 ............. G06N 20/20

OTHER PUBLICATIONS

Venkata, Santhilata Kuppili, et al, "EMCODIST: A Context-based Search Tool for Email Archives", 2021 IEEE International Conference on Big Data, Dec. 15, 2021, pp. 2281-2290. (Year: 2021).*
(Continued)

*Primary Examiner* — Laurie A Ries
(74) *Attorney, Agent, or Firm* — Holzer Patel Drennan

(57) ABSTRACT

A disclosed method facilitates AI-generation of a customized email per a methodology that significantly reduces the risk of the customized email including hallucinated facts or undesirable personal identity information (PII). The method includes identifying an email template and a recipient identifier that identifies a recipient of the customized email based on user inputs to an email application; mining contextual data stored in association with the recipient identifier; generating a large language model (LLM) prompt based on the email template and the contextual data; providing the LLM prompt as input to a trained large language model (LLM); receiving the customized email as an output from the LLM; and returning the customized email to the email application for display within a user interface.

20 Claims, 8 Drawing Sheets

(56) References Cited

U.S. PATENT DOCUMENTS

| | | | | |
|---|---|---|---|---|
| 2008/0178073 | A1* | 7/2008 | Gao | G06F 40/166<br>715/752 |
| 2020/0311680 | A1* | 10/2020 | Wahl | G06Q 10/101 |
| 2020/0327577 | A1* | 10/2020 | Truong | G06Q 30/0244 |
| 2023/0245651 | A1* | 8/2023 | Wang | G06N 5/022<br>704/275 |
| 2024/0281410 | A1* | 8/2024 | Williams | G06F 16/122 |
| 2024/0289360 | A1* | 8/2024 | Chepkwony | G06F 16/3328 |
| 2024/0303440 | A1* | 9/2024 | Fabian | G06F 40/18 |
| 2024/0303711 | A1* | 9/2024 | Tan | G06Q 30/0635 |
| 2024/0330578 | A1* | 10/2024 | Dotan-Cohen | G06F 40/279 |
| 2024/0378396 | A1* | 11/2024 | Bhupati | G06F 40/20 |
| 2024/0386886 | A1* | 11/2024 | Sharifi | G10L 15/22 |
| 2025/0047622 | A1* | 2/2025 | Bodigutla | H04L 51/02 |
| 2025/0061303 | A1* | 2/2025 | Sun | G06N 3/096 |
| 2025/0104693 | A1* | 3/2025 | Papayiannis | G10L 13/10 |
| 2025/0117595 | A1* | 4/2025 | Taheri | G06F 40/40 |
| 2025/0124236 | A1* | 4/2025 | Gupta | G06F 40/103 |
| 2025/0124308 | A1* | 4/2025 | Ramani | G06N 5/022 |
| 2025/0124471 | A1* | 4/2025 | Tan | G06Q 30/0201 |
| 2025/0217848 | A1* | 7/2025 | Lagi | G06F 16/9538 |

OTHER PUBLICATIONS

Anonymous, “Generate Emails with AI”, Mar. 30, 2023, pp. 1-9, cited on Applicant’s IDS filedJan. 16, 2025. (Year: 2023).*

“Generate Emails with AI” Retrieved from the URL:https://web.archive.org/web/20230330054822/https://minelead.io/blog/Generate-Email-With-Ai/.pdf, Mar. 30, 2023, pp. 1-9.

International Search Report and Written Opinion received for PCT Application No. PCT/US2024/048057, Dec. 19, 2024, 13 pages.

* cited by examiner

200

PII Filter
206

Template
204

{
Hi [name],

I hope this email finds you well and that you are enjoying the benefits of Office 365. I wanted to thank you again for choosing [company name] as your cloud storage provider and for trusting us with your data.

As we discussed in our last call, [product name] offers you a secure, reliable, and flexible way to access, share, and collaborate on your files from any device and location. You can also integrate it with other [company name] products, such as [products], to enhance your productivity and efficiency.

To help you get the most out of [product name], I would like to offer you some resources and support:

- You can access our user guide <a href="https://ls.ms.com/12345">here</a>", where you can find tips and tricks on how to set up, sync, share, and manage your files and folders.
- You can also watch this <a href="https://ls.ms.com/12345">video tutorial</a>", where you can learn how to use our [product] on your desktop, web, and mobile devices.

I hope you find these resources useful and that you are satisfied with your [product name] experience. I would love to hear from you and get your feedback on how it is working for you and your team.

Please let me know if you have any questions or concerns, or if you would like to schedule another call to discuss any additional features or solutions that [company name] can offer you.

Thank you for your business and your partnership. I look forward to hearing from you soon.
}

Prompt
212

Large Language Model (LLM)
232

Customized Email 230

Hi Laura,

I hope this email finds you well. I wanted to thank you again for choosing Microsoft OneDrive as your cloud storage provider and for trusting us with your data. — 236

As we discussed in our last call, Microsoft OneDrive offers you a secure, reliable, and flexible way to access, share, and collaborate on your files from any device and location. You can also integrate it with other Microsoft products, such as Office 365, to enhance your productivity and efficiency. — 238

I wanted to follow up on our conversation and let you know that I am arranging a follow up meeting with our customer success team to discuss the different pricing tiers and any additional features you may be interested in. I am also sending you the invoice with all the details for the basic plan. — 240

To help you get the most out of Microsoft OneDrive, I would like to offer you some resources and support:

- You can access our user guide <a href="https://ls.ms.com/12345">here</a>", where you can find tips and tricks on how to set up, sync, share, and manage your files and folders.
- You can also watch this <a href="https://ls.ms.com/12345">video tutorial</a>", where you can learn how to use our product on your desktop, web, and mobile devices. — 242

I hope you find these resources useful and that you are satisfied with your Microsoft OneDrive experience. I would love to hear from you and get your feedback on how it is working for you and your team.

Please let me know if you have any questions or concerns, or if you would like to schedule another call to discuss any additional features or solutions that Microsoft can offer you. Thank you for your business and your partnership. I look forward to hearing from you soon. — 244

Sincerely,
John Smith

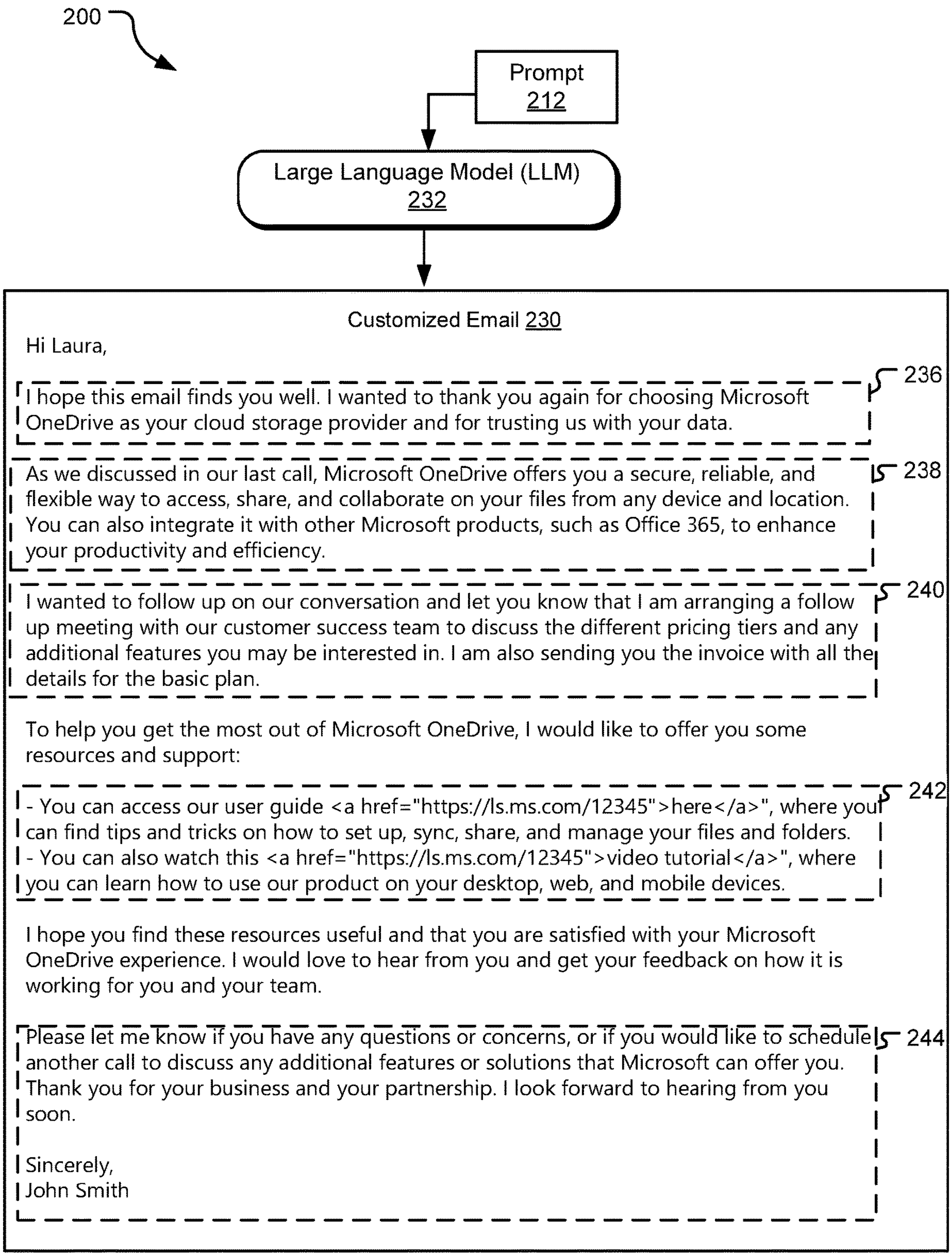

Prompt
312

Large Language Model
332

Customized Email 330

Dear Sarah,

It was great speaking with you today about the ergonomic chairs for R & S        340
Enterprises. I wanted to follow up with a quick summary of what we discussed.

We discussed the features of the ergonomic chairs and I provided information        342
on the different models and their features. You asked about the ergonomic
benefits and I provided information on the different models. You also
mentioned that you would like to check with accounting before making a
decision.
                                                                                   344
I have attached the slides from the presentation for your reference. I will also be
sending you the pricing tiers for the chairs. Additionally, I will be bringing the
chairs to your office for a demonstration and providing a list of customer
testimonials.

Please let me know if you have any other questions or feedback.

Best,
Mike Smith

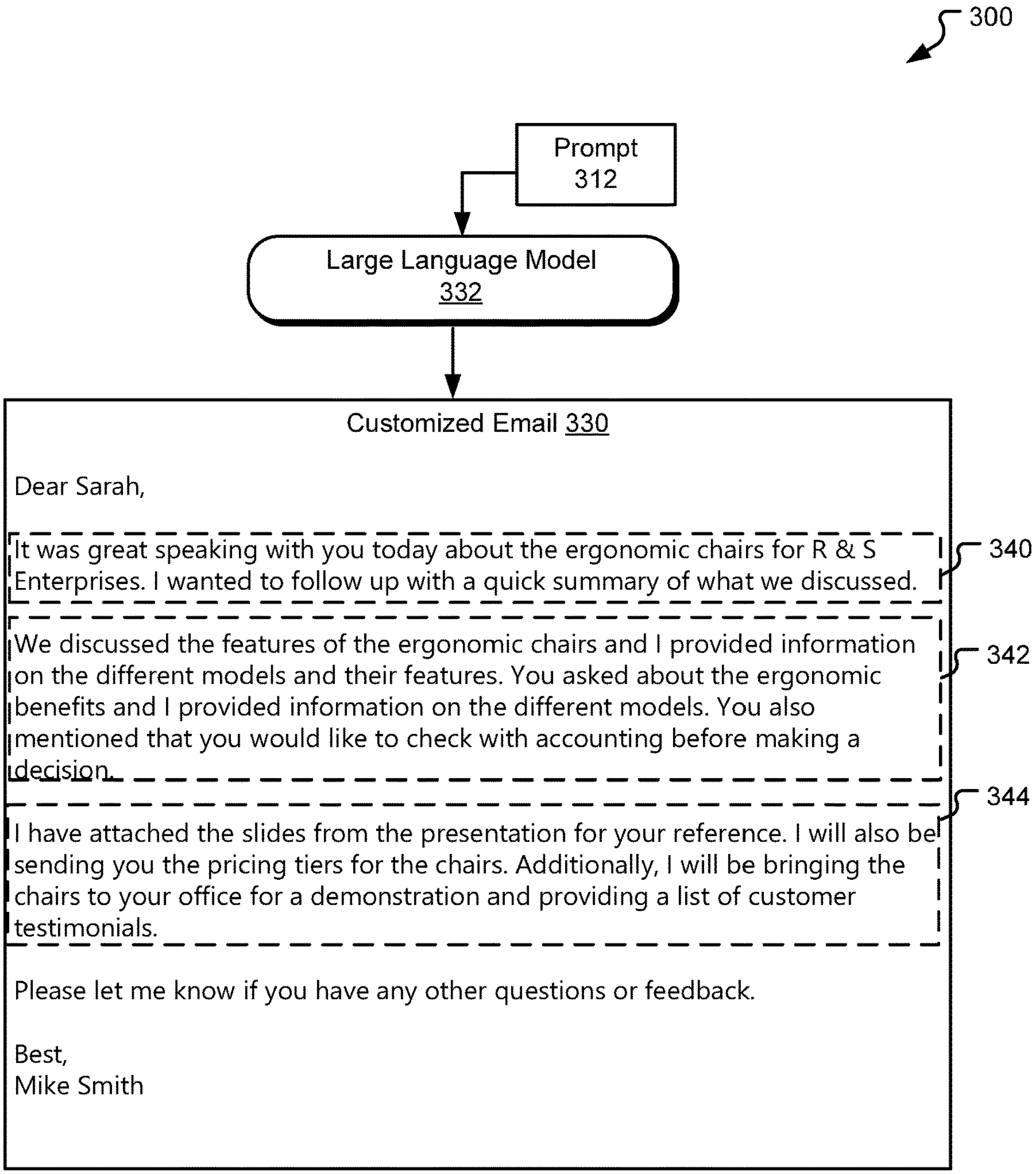

FIG. 3B

Identifying, based on inputs provided to an email application by a first user, an email template and a recipient identifier identifying a recipient of a customized email                                                        402

Mining contextual data associated with the recipient identifier, at least some of the contextual data pertaining to past communications between the first user and the recipient                                                        404

Generating a large language model (LLM) prompt based on the email template and the contextual data, the LLM prompt requesting as output the customized email                                                        406

Providing the LLM prompt as input to a trained LLM                                                        408

Receiving the customized email as output from the LLM                                                        410

Returning the customized email to the email application for display in an email composition window on a user interface                                                        412

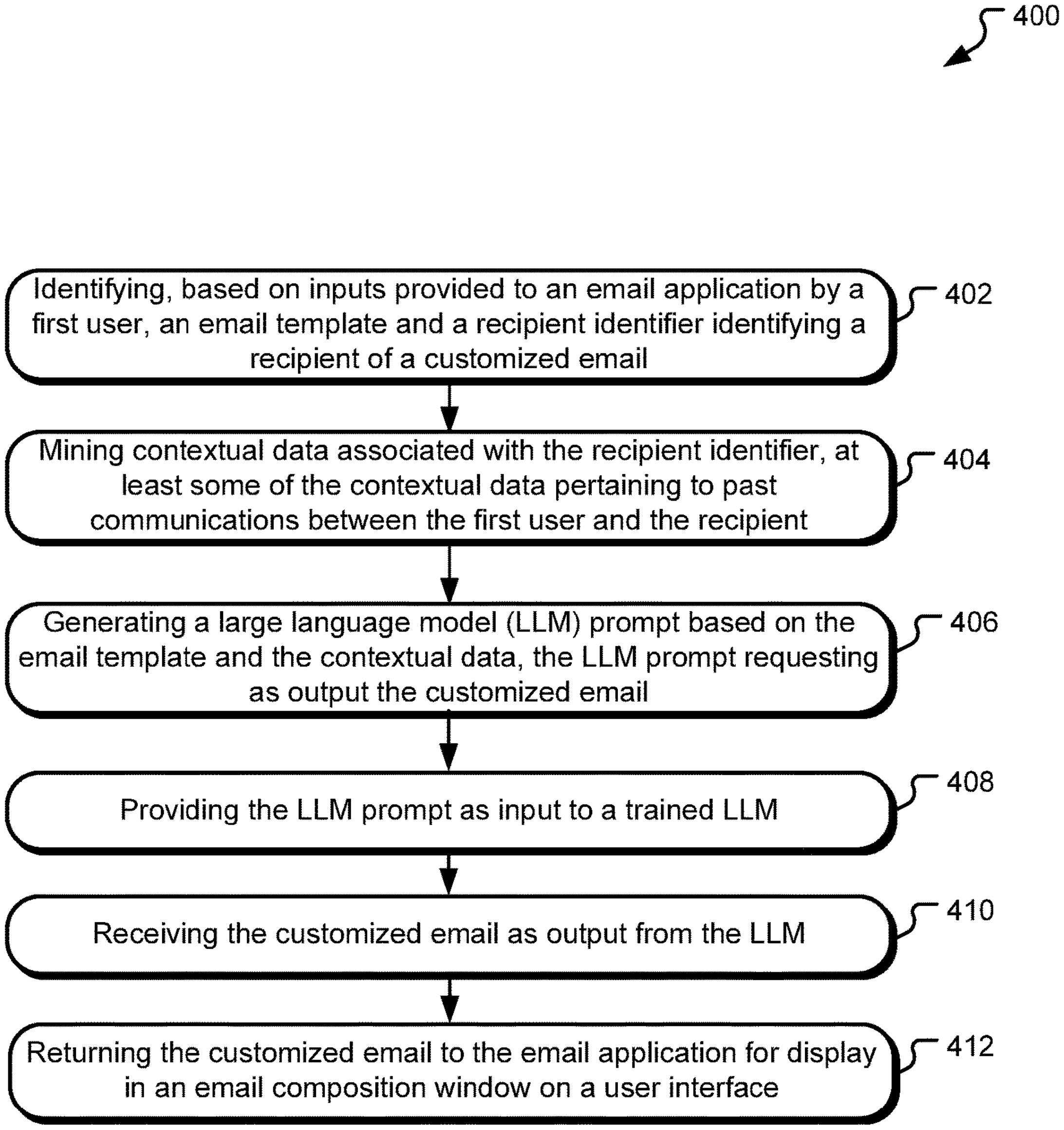

FIG. 4

IN-CONTEXT LEARNING WITH TEMPLATES FOR LARGE LANGUAGE MODEL GENERATION OF CUSTOMIZED EMAILS

BACKGROUND

Email communications are a key tool used by businesses to develop and maintain relationships with existing and prospective customers. Unsolicited emails from product and service vendors are often deleted without being read, particularly in cases when such emails are perceived by the recipient as bot-generated. In contrast, vendor emails are less likely to be deleted when drafted to incorporate details personalized to the recipient and/or stylistic elements characteristic of the drafting style of a particular human, such as a human that the recipient personally knows and/or has communicated with previously. When a human sales representative has taken the time to author a personalized message with details particular to the recipient (e.g., details referencing previous communications between the recipient and the sender or addressing unique characteristics and needs of the recipient), the human recipient is more likely to actually read and favorably respond to the incoming message. However, it is exceptionally time consuming for product and service vendor representatives to draft and send high volumes of outgoing personalize messages.

Some businesses use email templates as a time-saving alternative to entirely human-generated email business content. In this case, a service representative selects a template that includes relevant product or service details and then manually edits the template to add details such as the recipient's name and, in some cases, a few personalized comments or notes. Emails drafted from templates are typically not received as favorably as emails that are entirely hand-drafted because the template-based emails do not contain enough recipient-specific details to feel truly personalized. For example, these emails may lack information pertaining to how the product or service being offered can satisfy the recipient's personalized business needs. Templates do not capture the specific writing style of the email sender and, as such, often feel generic and robotic.

SUMMARY

According to one implementation, a method is disclosed for using a large language model (LLM) to generate a customized email according to a methodology that reduces the likelihood of the customized email including hallucinated facts or undesired (e.g., irrelevant) personal identifying information (PII). The method includes determining an email template and a recipient identifier that identifies a recipient of the customized email based on user inputs to an email application and mining contextual data stored in association with the recipient identifier. At least some of the contextual data pertains to past communications between a sender of the customized email and a recipient identified by the recipient identifier. The method further includes generating a prompt based on the email template and the contextual data that requests the customized email as output, providing the prompt as input to a trained large language model (LLM), receiving the customized email as an output from the LLM; and returning the customized email to the email application for display within a user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 2A illustrates an example of a template used within a system that implementing the disclosed technology to prompt a large language model (LLM) for customized email content.

FIG. 2C illustrates a customized email that is output by an LLM in response to receiving the prompt of FIG. 2B.

FIG. 3B illustrates an example customized email output by an LLM in response to receiving the prompt described with respect to FIG. 3A.

FIG. 4 illustrates example operations for using a trained LLM to generate a customized email while also lowering the likelihood of the customized email including hallucinated facts and inadvertently disclosed personal identifying information.

DETAILED DESCRIPTION

Figure 1:
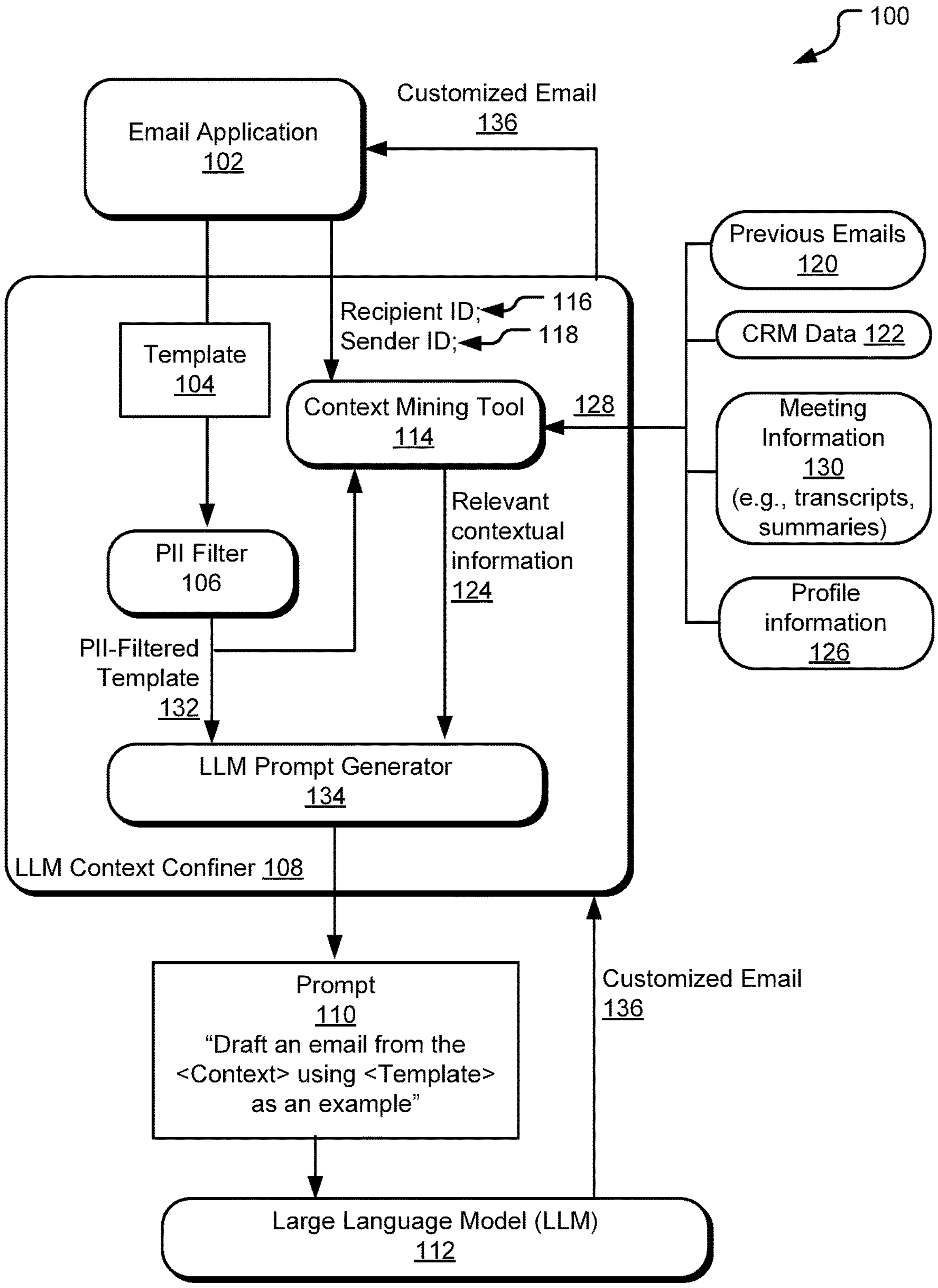
FIG. 1 illustrates an example system that uses generative AI to create customized email content according to a methodology that reduces a risk of the customized email including hallucinated facts or undesired personal identity information (PII) that may pose a legal risk to the creating entity.

With the rapid rise in the capability and availability of generative artificial intelligence (AI) tools, some businesses are exploring the use of AI tools for automatically generating business email content. For example, a natural language processing (NLP) model can be trained on customer data and outgoing customer emails pertaining to different products and services and then asked to generate an email for a specific customer (or for a customer with a specific characteristics) about a particular product or service. While some of the newer models can effectively compose content that feels more personalized than template-based emails, this use of AI to compose email content can create significant legal risks for the entity.

One source of risk presented by AI-generated email content stems from model hallucinations. A hallucinated fact output by a model is a fact that is irrelevant, nonsensical, or factually incorrect. Model hallucinations arise from patterns in model training data that mathematically lead the model to make incorrect inferences with absolute confidence. Hallucinations present the risk of conveying incorrect or nonsensical information to existing and potential customers, which may create confusion about product or service offering and/or potentially offend or anger customers.

Another risk of using generative AI to compose business email stems from the very significant legal risk that the model may potentially output sensitive personal identifiable information, referred to herein as "PII", that was inadvertently included in the model's original training dataset or that was included in model inputs that were ultimately stored by the model in some way, such as during model updates performed during reinforcement learning operations. For example, an email generated for a first customer could include financial account information or sensitive identity information for another customer. Although there do exist ways to mitigate this risk, even a single inadvertent disclosure out of millions of outgoing emails has the potential to create significant legal liabilities for a business enterprise.

To mitigate legal liability and the transmission of misinformation, current best practices require meticulous human review of all AI-generated emails to ensure draft emails are free of hallucinated facts and PII. However, even in these cases, final outgoing emails can still feel generic or robotic to the recipient because they lack personalized writing style of the sender. Additionally, these existing AI approaches require model training-either to train a completely new model or, at minimum, to fine-tune of the parameters of an existing model. Model training is time-consuming, processor intensive, and may have to be frequently repeated (depending upon the implementation) to ensure that the training dataset encompasses sufficient details about the evolving customer base and/or alterations to product and service offerings.

The herein-disclosed technology provides a tool, referred to herein as an "LLM context confiner," that prepares an input prompt instructing a large language model (LLM) to generate a customized email. The novel structure and content of the input prompt enables the LLM to draft a customized email that is: (1) designed to be free of hallucinations and PII (e.g., of low risk of including either as compared to other generative AI approaches for generating customized email); (2) personalized to the identity, needs, and previous interactions of the email recipient; and (3) stylized according to the personalized drafting style of the person sending the email, such as by incorporating aspects of the sender's written voice—e.g., sentence structure, colloquialisms, jargon, and personalized tone. These capabilities make it possible for the LLM to draft personalized email content that sounds human-generated and that is favorably received while simultaneously increasing the efficiency of product support teams tasked with sending high volumes of outgoing customer email.

The above-described benefits result primarily from the usage of a novel and particularized in-context learning technique that is utilized by the LLM context confiner when generating each customized LLM prompt. In-context learning is a specific method of prompt engineering in which demonstrations of a task are provided to the model as part of the prompt, in natural language. When using in-context learning, off-the-shelf LLMs can be used to solve novel tasks without the need for fine-tuning various parameters (e.g., providing additional training data specific to the nature of the task that the model is being invoked to perform). While the phenomena of in-context learning is becoming better known in the field of machine learning, in-context learning is typically used in discriminative AI applications (e.g., classification tasks) rather than generative AI applications (e.g., tasks that cause the model to create and output new data not included within the training dataset). In a common application of in-context learning to perform a discriminative AI task, an LLM receives a prompt that includes a series of example inputs/outputs followed by a final input that lacks an accompanying output. The prompt further includes a natural language instruction that instructs the LLM is asked to generate the output to the final input based on the series of examples.

In the herein-disclosed in-context learning technique, the LLM is provided with a prompt including an email template that acts as the "example" and relevant personalized context that the model is asked to use to modify the example. In one implementation of the foregoing, a software tool, referred to herein as an "LLM context confiner", acts as an intermediary between an email application and a LLM. A user (e.g., email sender) selects the email template from within the email application, such as by selecting one of multiple pre-created templates from a template library or by selecting an email that the sender previously drafted and sent to another recipient that includes some relevant content. From within the email application, the user also designates a recipient of the email. The LLM context confiner receives information identifying the recipient of the email and mines various data sources to identify and compile contextual information from which the personalized context for the email can be extracted. For example, the contextual information includes details pertaining to the specific needs of the recipient's business and/or details of previous correspondences between the email sender and the email recipient. The LLM context confiner then creates a custom LLM prompt that includes the template and the relevant contextual information and that further includes an instruction to the LLM asking the LLM to construct an email using the relevant contextual information while following the format of the email template.

In response to receiving the above-described custom-generated prompt, the LLM composes an email that is limited in content to language that is directly pulled from or based on the template and/or the relevant contextual information. Due to the limitations in permissible output content that are imposed by the nature and content of the prompt customized for the recipient, a trained general-purpose LLM can be called upon and used to generate the personalized email in a manner that virtually eliminates the risk that the LLM may incorporating information into the draft email that is external to the input prompt.

Additionally, the forgoing is all achieved using a publicly-available (off-the shelf) LLM, without any fine-tuning of model parameters. Since model training is not required, the solution can be implemented at low cost to development teams (e.g., faster, while using fewer computational resources). Additionally, the solution can be implemented without a need for any on-going maintenance training of the model, such as model training updates that might otherwise by prompted by changes in product and service offerings or the customer base.

FIG. 1 illustrates an example system 100 that uses generative AI to create customized email content according to a methodology that lowers the likelihood of the model outputs including hallucinated facts or sensitive personal identity information (PII) that may pose a legal risk to the creating entity. Within the system 100, a user provides input to an email application 102 to initiate generation of a customized email. The email application 102 may include software components that execute locally on a user device, remotely in a cloud platform, or some combination thereof.

The system 100 includes an LLM context confiner 108 that acts as an intermediary between the email application 102 and an LLM 112 that ultimately generates draft emails that are returned to the email application 102. The LLM context confiner 108 performs operations for assembling individual components of a prompt 110 and of ultimately using the individual components to generate the prompt 110. In one implementation, the LLM context confiner 108 is software plug-in designed to integrate with the email application 102. In various implementations, aspects of the LLM context confiner 108 reside locally on the device of the end user, remotely in the cloud, or some combination thereof.

The LLM 112 can be any off-the-shelf (e.g., third-party developed) large language model that is implemented in the system 100 and used as described herein without additional training or fine-tuning of parameters. In general, the term LLM refers to a language model that is characterized by its large size. LLMs are artificial neural network which can contain a billion to a trillion weights and are (pre-) trained using self-supervising learning and semi-supervised learning techniques. Examples of off-the-shelf LLMs include generative pre-trained transformer models (e.g., GPT-3, GPT-3.5, GPT-4) and transformer-based models such as PaLM 2 (Pathways Language Model, version 2), Claude v1, LLaMA (Large Language Model Meta AI), OPT (Open Pretrained Transformer), and Bloom language model (Bioscience Large Open-science Open-access Multilingual), etc.

The LLM 112 is, in one implementation, a cloud-based model that includes one or more model endpoints, with each model endpoint including server hardware implemented on one or multiple virtual machines or servers configured to execute compute logic of a trained natural language processing model. In other implementations, aspects of the LLM 112 are executed locally (e.g., on a same device executing the email application 102 and/or the LLM context confiner 108). In still other implementations, aspects of the LLM 112 are executed on one or more edge devices.

To initiate auto-generation of a customized email from within the email application 102, a user selects an option from within a GUI of the email application 102 to indicate their desire to draft an email using a template. In response, the email application prompts the user to either select a template or, in some implementations, to provide information that the email application 102 uses to select a template.

In one implementation, the user selects a template 104 (e.g., from a drop-down menu or library) that is to be used as an example for generating the email. For example, the template 104 is selected from a library of pre-generated templates that are each tailored for a different purpose, product, and/or target customer (e.g., based on specific characteristics of the customer or customer's business). The types of templates present in the template library and content of each template may vary considerably depending upon the nature of the business entity using the system 100, such as based on the types of products or services offered by the business and/or the types of customer communications that the business regularly conducts.

In one implementation, the user selects the template 104 from a pre-populated template library including templates designed for purposes such as making initial contact with a prospective customer, follow-up contact with an existing customer, providing information about specific different products or services, providing information about resources that can guide the customer to better utilize products or services that the customer is already subscribed to, etc. These different templates may, in some cases, be uniquely tailored to different target customer types. For example, some templates may include product information tailored to address the needs of large business (e.g., greater than 500 employees) while other templates include product information tailored to address the needs of small businesses.

Some implementations of the email application 102 provide the user with the option of selecting an email previously-composed by the user to use as the template 104 either in addition to or in lieu of the option to select the template 104 from a pre-populated template library. If, for example, the user spent a long time drafting a very detailed email about a particular new service offering to a first customer, it may be that the user wants to use that previous email as an information template that is to be modified and sent to a different user. In this case, the user selects the previous email when prompted to select the template 104.

In still another implementation, the email application 102 selects the template 104 based on characteristics of a desired template that are supplied by the user. In this case, the email application 102 implements logic to select a template from a template library or from the user's inbox/output that most closely resembles the characteristics the user is seeking. For example, the email application 102 may include a natural language prompt into which the user types "I want to compose an email describing Microsoft OneDrive® security features." Based on this, the email application 102 identifies a suitable template that includes a description of Microsoft OneDrive® security features.

In some cases, such as in scenarios where the template 104 is a previously-composed email, the template 104 may initially include personal identity information (PII) (e.g., sensitive and/or confidential customer information) such as names, account information, contact information (e.g., addresses, phone numbers, email addresses). To ensure this this PII does not get input into the LLM or find its way into the customized email being generated, a PII filter 106 is used to strip the PII information from the template 104, generating "PII-filtered template 132." In one implementation, the PII filter 106 replaces each stripped PII field with a generic placeholder indicating the type of information that was stripped in the corresponding template location. For example, an account number is stripped and replaced with the placeholder text "[Account Number]." This step is effective to ensure that stripping the PII does not have effect of preventing the LLM from understanding what the PII represented and how it related to surrounding text. When the above-described placeholder notation is used, the LLM 112 is able to determine the type of information corresponding to each stripped PII field and thereby identify contextually-appropriate content to substitute in the customized email. For example, the stripped account number replaced with placeholder '[Account Number]' may ultimately be replaced with an account number for the intended recipient of the draft email. Beneficially, stripping the PII from the template 104 helps to ensure confidentiality (which may be considered "breached" in scenarios where PII is provided as input to a third-part AI tool) and also ensures that the LLM 112 cannot store and/or inadvertently output such information at any point in the future.

Notably, the step of PII filtering is especially important in cases where the user selects a previously-composed email to use as the template 104. The step of PII filtering may be skipped in cases where the template 104 is selected from a template library comprising templates designed to serve as templates that were constructed per a methodology sufficient to ensure that all of the stored templates are free of PII.

Within the email application 102, the user also identifies a recipient of the customized email that is to be drafted, such as by selecting a contact card for the recipient, typing the recipient's name, email address, or other form of recipient identifier 116. A context mining tool 114 uses the recipient identifier 116 along with an identifier of the user composing the message (e.g., sender ID 118) and the PII-filtered template 132 to mine contextual data 128 from various data sources that is potentially relevant to the draft email. In use cases that do not include PII filtering, the context mining tool 114 receives the template 104 as input rather than the PII-filtered template 132.

In different implementations, the contextual data 128 is mined from various data sources both internal and external to the email application 102. For example, the context mining tool 114 searches email history of the user and adds to the contextual data 128 a collection of previous emails 120 that were either sent by the user to the recipient or received by the user from the recipient. Likewise, if a customer resource management (CRM) platform is used to log and track customer information, the context mining tool 114 may access CRM data 122 of the user's CRM platform and identify CRM profile(s) (e.g., customer profiles) potentially relevant to the recipient ID 116. These profiles and their corresponding stored data (e.g., profile information, notes regarding recent interactions with the customer, follow-up actions that need to be taken) are added to the contextual data 128 for further relevance analysis.

In some implementations, the user's compute environment includes tool(s) that collect and store meeting information 130, such as a transcripts or summaries of different meetings. For example, Microsoft's Sales Copilot® is an add-on to Microsoft Teams®, which business users frequently use to conduct web-based calls. Microsoft Teams is capable of recording calls and using the call recordings to create meeting transcripts. Sales Copilot® can, in turn, use the transcripts and recorded calls to generate meeting summaries that include, for example, a summary of subject matter discussed, relevant keywords, action items, a breakdown of customer sentiments during the call, and more. In one implementation, the meeting information 130 includes these types of summaries that are generated from voice conversations and stored in association with the recipient ID 116 and/or the sender 118, and the context mining tool 114 mines this data and adds it to the contextual data 128.

In some implementations, the context data 128 comprises profile information 126 such as profile information stored in association with the email accounts (e.g., contact card information) of the recipient ID and/or sender ID. In other implementations, the contextual information 128 includes a variety of other types of local and remotely-stored information that is accessible to the email application 102.

When mining the contextual data 128, the context mining tool 114 may in some implementations execute logic to reduce the quantity of mined information by relevance-based filtering. If, for example, the CRM data 122 includes six different profiles associated with the recipient ID 116, the context mining tool 114 applies logic to select a most relevant one of the profiles to include in the contextual data 128. For example, the context mining tool 114 may analyze timestamps of updates to the different profiles and select add the most-recently updated profile to the contextual data. Alternatively, the context mining tool 114 utilizes information within the template 104 and metadata of the template 104 to identify which portions of the CRM data 122 to include in the contextual data 128. If, for example, the CRM data 122 includes multiple profiles associated with the recipient ID 116 and the template 104 includes detailed information about a particular product, the context mining tool 114 may selectively include in the contextual data 128 of a select one of the multiple profiles associated with the recipient ID 118 that also stores a note indicating a recent discussion about the product.

Upon retrieving the contextual data 128 associated with the sender 118 and the recipient ID 116, the context mining tool 114 analyzes the contextual data 128 to identify different types of entities (e.g., names, data, products, prices, account name, information identifying sales stage, previous interaction details, and more) within each item of information returned (e.g., each CRM profile, meeting summary, previous email sent). These entities are then scored and ranked according to most-probable relevance to the template 104, recipient ID 116, and/or the sender ID 118.

In one implementation, the context mining tool 114 also analyzes content of the template 104 (either before or after the template 104 is filtered by the PII filter 106) to identify different types of entities associated with the template 104, such as entities that are mentioned in the template 104 or that are otherwise described or referenced in the template 104. These entities are scored and ranked to derive a set of "important template entities" with highest importance within the template 104 (e.g., a product name, a particular promotion). In some cases, the important template entities are used to rank relevance of various information items and/or entities identified in the contextual data 128. If, for example, a particular entity such as a product name is identified as existing within or relevant to both the template 104 and also within the contextual data 128 (e.g., the template 104 names a particular product and the contextual data 128 includes a meeting summary referencing the same product) this is a strong indicator that the entity is highly relevant to the email and may provide a basis for including the contextual data 128 referencing the entity within relevant contextual information 124, discussed further below.

The context mining tool 114 uses the scored and ranked entities (e.g., from the contextual data 128 and, in some implementations, the template 104) to identify the individual most relevant items (e.g., profiles, meeting summaries, previous emails) within the contextual data 128 and/or the most relevant entities named within the items of information. These identified most relevant items and/or entities are aggregated to create "relevant contextual information 124." As used herein, the term "relevant contextual information 124" refers to a subset of the contextual data 128 that is mined from the various internal and/or eternal data sources that is determined to have a highest probability of relevance to the email that is to be drafted (e.g., based on probability of relevance to information included in the template 104, the sender ID 118, and/or the recipient ID 116). This relevant contextual information 124 is ultimately inserted into the prompt 110 that is provided to the LLM 112.

The relevant contextual information 124 is provided as input to an LLM prompt generator 134 along with "a template body," which refers to either the PII-filtered template 132 or the template 104 (e.g., in use cases that do not include PII filtering) along with metadata of the template, if any exists. Based on the relevant contextual information 124 and the template body, the LLM prompt generator 134 generates the prompt 110. The prompt 110 includes both the template body and the relevant contextual information 124 and further includes an instruction asking the LLM 112 to draft an email based on the relevant contextual information 124 following the template 104.

The LLM 112 processes the request and outputs a customized email 136 that is returned to the LLM context confiner 108. The LLM context confiner 108 then displays the customed email 136 in an email composition window of the email application 102.

The customized email 136 is, for the reasons discussed elsewhere herein, at much lower risk of including hallucinated facts and undesired/irrelevant PII information, and is also personalized with factual information specific to the recipient (e.g., due to the drafting instructing to compose the email based on the relevant contextual information 124). This is all advantageously achieved within a framework that is free of model training, and without the tedious, power-intensive, and resource intensive compute overhead of model training. Additionally, in scenarios where the user selects an email they previously-composed as the template 104, the resulting customized email 136 is, as an inherent consequence of transformer-based model logic, very likely to incorporate stylistic elements of that prior email. For example, the AI-generated email may incorporate sentence structures, colloquialisms, salutations, and terminology in the template 104 that reflect the drafting style of the user, making the customized email 136 read as though it was indeed authorized by the user.

FIG. 2A illustrates an example of a template 204 used within a system 200 that implementing the disclosed technology to prompt an LLM for customized email content. In FIG. 2A, the template 204 is a previous-composed email that has been passed through a PII filter 206 with characteristics the same or similar as those described with respect to the PII filter 106 of FIG. 1. It is assumed that template 204 is selected from within an email application in a manner consistent with the description of the system 100 shown in FIG. 1. Features of the system 200 not specifically described with respect to FIG. 2A are assumed to be the same or similar to features of like-named components described with respect to FIG. 1.

The PII filter 206 includes logic executable to identify and redact information determined to correspond to various types of PII entities representing, where PII entity types include, for example, phone number, account number, name, address, company name, company location, and more. In one implementation, the PII filter 206 is a machine learning model trained on documents including PII and corresponding classification information that indicates which portions of those documents actually include the PII. In other implementations, the PII filter 206 applies various rules and contextual logic to identify PII in lieu of a trained model.

The PII filter 206 replaces each identified PII entity in the previously-composed email with a placeholders naming a corresponding PII entity type. For example, the template 204 that is output by the PII filter 206 includes placeholders "[name]", "[product name]", "[company name"], and "[products]" in various places been inserted by the PII filter 206 in place of the corresponding PII entities named in the previously-composed email.

Although the template 204 is described above as being a previously-composed email, characteristics of the template 204 are also consistent with that of a pre-generated email template that is made available for user selection within an email application, such as part of a pre-populated template library (e.g., where the templates in the library are initially generated for the purpose of being selectable templates). In implementations that offer both pre-generated templates for user selection and that also provide the user with the option of selecting a previously-composed email as the template 204, the pre-generated templates may utilize the placeholder convention (e.g., using square brackets around an entity descriptor) indicating locations where PII can be inserted by the LLM (e.g., to denote locations where the LLM can selectively insert PII fields that are supplied within the mined contextual data that is also provided as input to the LLM).

Figure 2B:
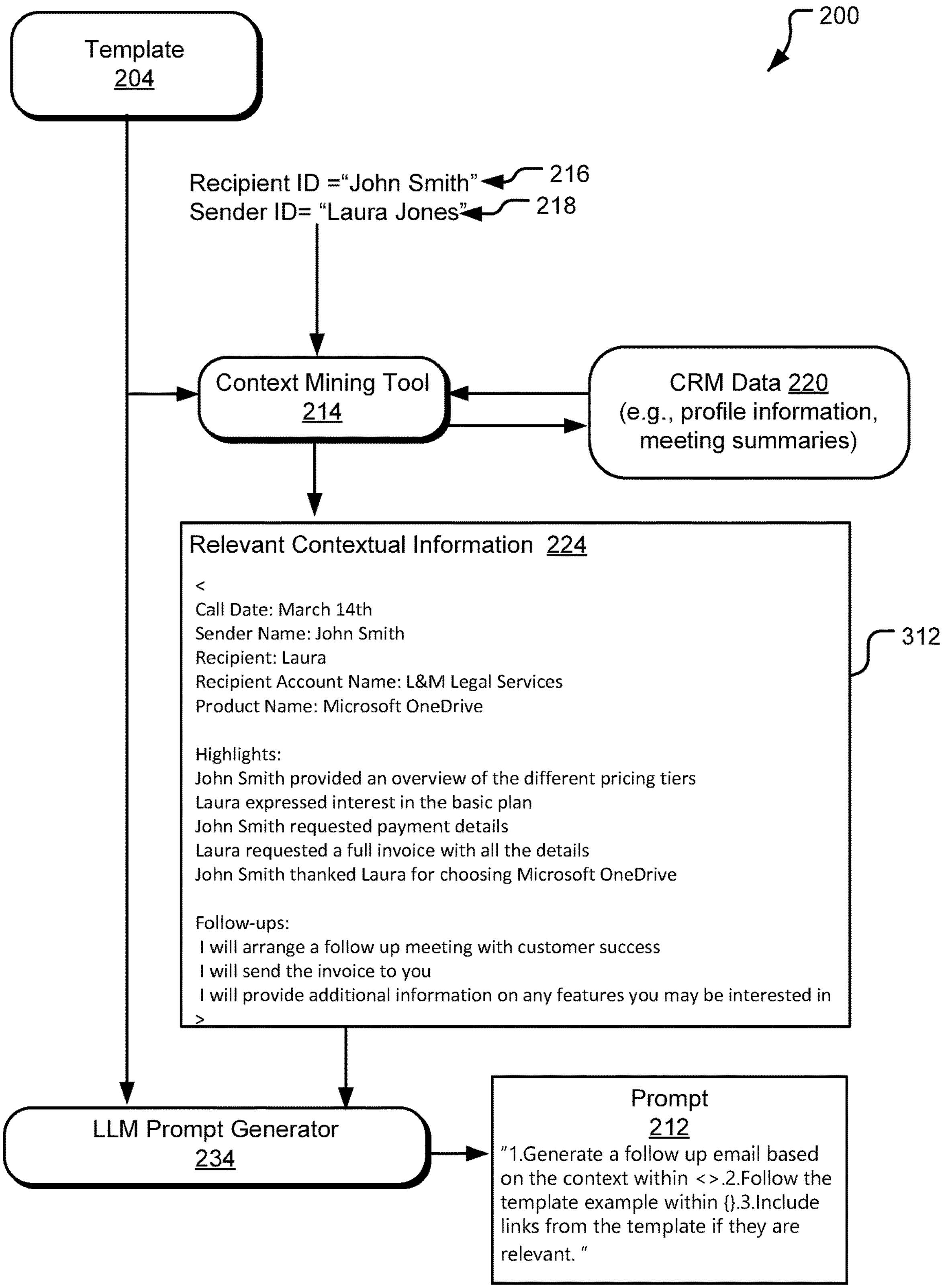
FIG. 2B illustrates further aspects of the system of FIG. 2A including a context mining tool that assembles relevant contextual information to include within the prompt.

FIG. 2B illustrates further aspects of the system 200 including a context mining tool 214 that assembles relevant contextual information 224 to include within the prompt to the LLM. In this case, the template 204 of FIG. 2A is provided as an input to the context mining tool 214 along with a recipient ID 216 identifying a target recipient of a customized email that is to be generated based on the template 204. In some implementations, the context mining tool 214 also receives as input a sender ID 218 identifying the user that is requesting auto-generation of the customized email.

Upon receiving inputs including the recipient ID 216, the template 204, and/or the sender ID 218, the context mining tool 214 accesses stored CRM data 220 and mines contextual data that is associated with one or more of the inputs. In this case, the context mining tool 214 searches for customer profiles within the CRM data 220 that include the recipient ID 216.

If more than one customer profile includes the recipient ID 216 (e.g., a name), the context mining tool 214 attempts to use the template 204 and/or the sender ID 218 to identify a most relevant one of those profiles. If, for example, two profiles are pulled for the recipient ID 216 (e.g., a name, "John Smith") and the template 204 describes a particular product (e.g., Microsoft OneDrive), the context mining tool 214 searches the data stored in or in association with these two profiles for notes pertaining to previous conversations about the particular product. If a first one of the two profiles includes a recent summary of a conversation about the particular product (e.g., Microsoft OneDrive), this is a strong indicator of the profile being the most relevant profile of the two.

Likewise, in the above example, the context mining tool 214 may also parse the CRM data 220 within the two "John Smith" profiles for references to the sender ID 218 (e.g., the name of the user that is trying to generate the customized email). If, for example, a first one of the two John Smith profiles includes a note indicating a recent conversation with the user, this is also a strong indicator that the first profile is the more relevant profile.

The above types of analysis can, in some implementations, be carried out by an entity relevance scoring and/or ranking algorithm that examines correlations between the mined data and the template 204, recipient ID 216, and/or sender ID 218 to identify the most relevant subset(s) of the mined information.

In the illustrated example, the recipient ID 216 is "John Smith" and the sender ID 218 is "Laura Jones." Assume, for example, that the context mining tool 214 identifies a few different "John Smith" profiles within the CRM data 220 but determines that one of the John Smith profiles includes a meeting summary detailing a recent call (e.g., within the past 2 days) between John Smith and a representative named "Laura." In this case, the context mining tool 214 executes scoring logic to quantify the strength of correlation between the inputs to the context mining tool 214 and the different John Smith profiles. The "John Smith" profile with the stronger correlation to the inputs is identified as the most relevant profile and added to contextual information (not shown) that is subjected to further relevance analysis. During this additional analysis, the context mining tool 214 parses the mined contextual data for specific information items that are most likely to be relevant to the draft email. For example, the retrieved "John Smith" profile is parsed and the meeting summary for the recent meeting with Laura is identified is relevant while other, older meetings stored in the same CRM profile are determined to be irrelevant. These determinations are, in various implementations, based on different types of scoring and relevance ranking algorithms readily known to those in the art.

By applying the above-described scoring and ranking logic to information items identified within the CRM data 220, the context mining tool 214 assembles and outputs relevant contextual information 224. As shown, this information includes a summary of a recent meeting including the parties that attended the meeting, the date of the meeting, a product discussed, highlights of the meeting, and action items that were identified during the meeting. This contextual information is provided as input to an LLM prompt generator 234, along with the template 204.

The LLM prompt generator 234 generates a prompt 212 in natural language that includes the following components:

1. The template 204 included within a first type of brackets, { } (e.g., as shown in FIG. 2A);
2. The relevant contextual information 224 within a second different type of brackets, < >; and
3. A prompt that includes the natural language instruction: "1. Generate a follow-up email based on the context within< >. 2. Follow the template example within { }. 3. Include links from the template if they are relevant."

FIG. 2C illustrates a customized email 230 that is output by an LLM 232 in response to receiving the prompt 212, as described above, which is generated per the operations described with respect to FIGS. 2A and 2B.

Here, the customized email 230 includes an intro portion 236 that includes stylized language from the template 204. This intro portion is followed by a product description portion 238 that includes detail from the template with product names populated from the relevant contextual information 224. A third paragraph 240 following the product description portion 238 includes additional context from the relevant contextual information 224 that references the recent meeting between the two parties and also summarizes the "follow-ups" identified in the relevant contextual information 224 as affirmative actions that are being taken. The email includes links 242 from the template 204, and the remaining portion 244 of the email following the links 242 also includes text that is taken, verbatim, from the template 204. In scenarios where the template 204 was an email previously drafted by the user, the user's own writing style is therefore captured in the customed email 230 generated by the LLM 232.

Figure 3A:
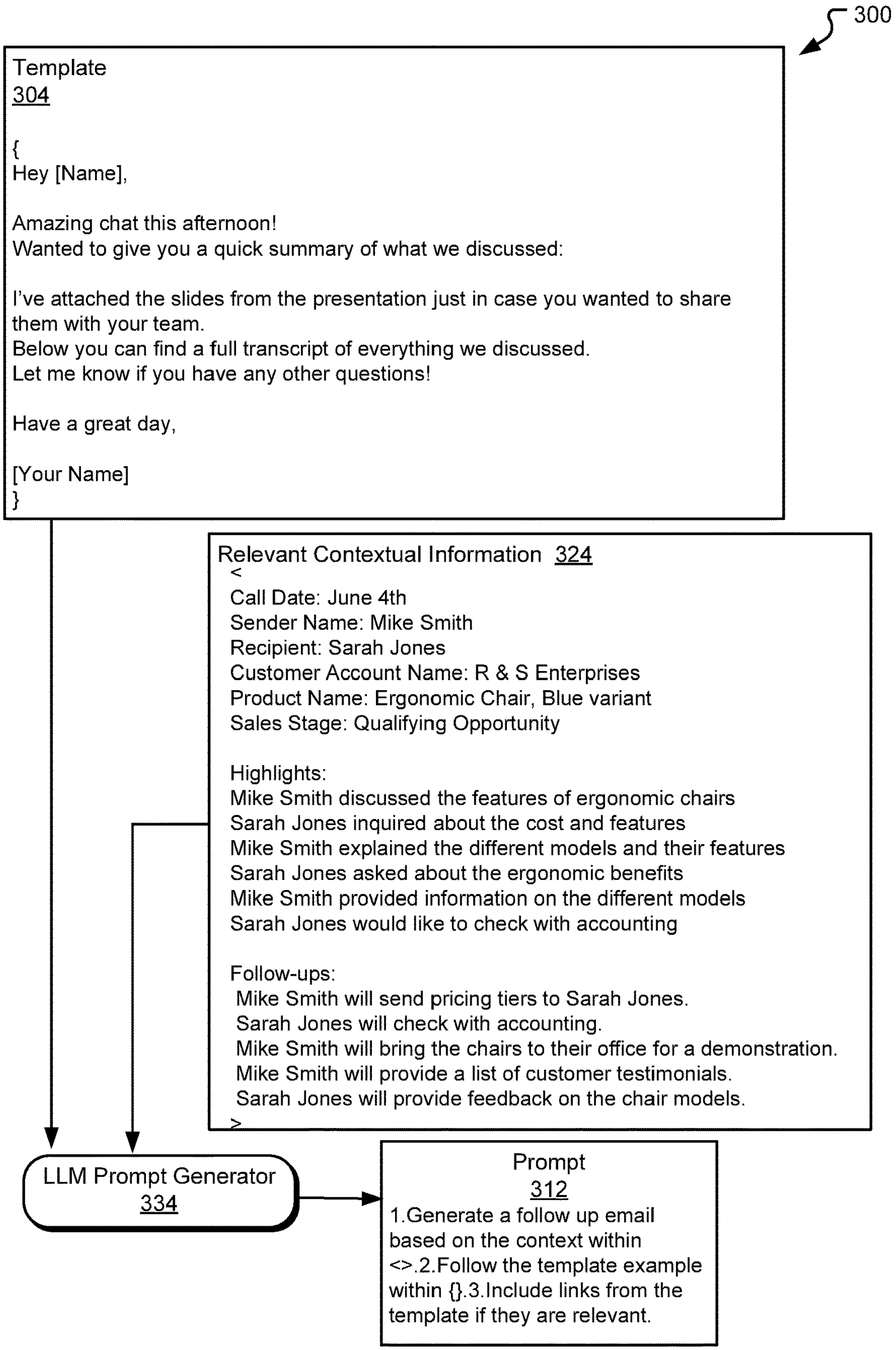
FIG. 3A illustrates operations performed by another example system that uses a template, mined contextual data, and a LLM to generate a customized email.

FIG. 3A illustrates operations performed by another example system 300 that uses a template 304, mined contextual data (e.g., relevant contextual information 324), and an LLM to generate a customized email. The template 304 can be understood as being either a pre-generated template (e.g., selected from a template library) or an email that was previously composed by the user and that was selected by the user to serve as an email template when generating a customized email. In use cases where the template 304 is a previously-composed email, the template 304 is subject to PII filtering prior to the operations shown in FIG. 3A. In implementations where the template 304 is selected from a template library, the step of PII filtering may be skipped.

In this example, the template 304 includes a friendly follow-up message pertaining to a presentation. Within an email application, a user selects an option for auto-generating a customized email. When prompted by the email application, the user selects the template 304 and supplies a recipient identifier that identifies a target recipient of the customized email. The email application provides the template 304, recipient identifier, and a sender identifier (e.g., an ID for the user) as input to a context mining tool (not shown), and the context mining tool mines data from various data sources contextual data that is associated with one or more of the inputs. Consistent with other implementations described herein, the context mining tool executes logic to determine relevance of each of the mined items of information and/or of the entities referenced within those information items relative to the template 304, recipient identifier, and sender identifier. In some implementations, this logic entails scoring and ranking different entities and/or information items. As the result of this analysis, the context mining tool outputs the relevant contextual information 324.

In the example of FIG. 3A, the relevant contextual information 324 includes a meeting summary identifying participants in a sales meeting, a customer that the meeting was conducted on behalf of, a product discussed ("Ergonomic Chair, Blue variant"), and information identifying a stage of the sale. The relevant contextual information includes several short statements summarizing meeting highlights (e.g., discussion points and questions asked) as well as various follow-up actions that were identified during the meeting. This relevant contextual information 324 is provided as input to an LLM prompt generator 334 along with the template 304. With this information, the LLM prompt generator 334 generates a single prompt that includes the relevant contextual information 324 in < > brackets, the template 304 in { } brackets, and the natural language instruction "1. Generate a follow up email based on the context within < >. 2. Follow the template example within { }0.3. Include links from the template if they are relevant."

FIG. 3B illustrates an example customized email 330 output by an LLM 332 in response to receiving the prompt 312, which is described above with respect to FIG. 3A. In this case, a first portion 340 of the customized email follows the introductory portion of the template 304 (shown with respect to FIG. 3A), but with additional context from the relevant contextual information 324 pertaining to the company name and product discussed. A second portion 342 of the email summarizes highlights of the meeting (which were included in the relevant contextual information 324), which is consistent with the second sentence of the template 304 which reads, "I wanted to give you a summary of what we discussed."

A final remark section 344 in the customized email 330 indicates that slides from the presentation are attached (verbatim identical to the template 304). Notably, the interpretation of this statement does not depend upon any information within the slides, so the LLM 332 is able to recycle the language verbatim without having obtained the slides or any metadata pertaining to the slides. In this example, it is assumed that the user selected the template referencing the slides because the user intends to attach slides to the email prior to sending.

The statement referencing slides is followed by action item promises pertaining to "follow-up" points that were identified in the relevant contextual information 324 ("I will be bringing the chairs to your office for a demonstration and providing a list of customer testimonials").

Notably, the customized email does not include a reference to the transcript of the meeting that appears in the template 304 (e.g., template language reading: "below you can find a full transcript [of the meeting]"). Since the LLM 332 did not receive a "full transcript" or any information within the prompt that provides context regarding what the transcript is, the LLM 332 is not confident as to how it is to follow this portion of the example. Therefore, the LLM 332 simply omits it.

FIG. 4 illustrates example operations 400 for using a trained (e.g., off-the-shelf) LLM to generate a customized email while also lowering the likelihood of the customized email including hallucinated facts and inadvertently disclosed PII (e.g., PII that is for someone other than the email recipient) in comparison to other existing approaches for using generative AI for customized email generation. An identifying operation 402 identifies, based on inputs provided to an email application by a first user, an email template and a recipient identifier identifying a recipient of a customized email. In some implementations, the email template is an email previously composed by the first user. In other implementations, the email template is selected from a template library comprising templates crafted to serve as templates, such as that provide information on different products or services, target customers with different characteristics, etc.

A data mining operation 404 mines contextual data associated with the recipient identifier from one or more data sources, such as data stored within an email application, within a customer resource management (CRM) application, web-based conferencing application (e.g., stored meeting transcripts, meeting summaries), or various local or remote data sources used to store user profile data that are accessible to the above types of applications. At least some of the contextual data mined is data that pertains to past communications between the first user and the recipient. For example, the contextual data includes past emails exchanged between the first user and the recipient or meeting summaries or transcripts detailing meetings attended by both of the first user and the recipient.

A prompt generation operation 406 generates an LLM prompt based on the email template and the contextual data. The prompt requests as output from the LLM the customized email. In some implementations, the LLM prompt includes the email template and a subset of the contextual information ("relevant contextual information") identified, by a scoring or ranking algorithm, as most relevant to content of the email template or to a sender identifier identifying the first user. For example, the LLM prompt instructs the trained LLM to generate the customized email based on the relevant contextual information using the email template.

A providing operation 408 provides the LLM prompt as input to a trained LLM and a receiving operation 410 receives, from the LLM, the customized email.

A returning operation 412 returns the customized email to the email application for display in an email composition window presented on a user interface.

Figure 5:
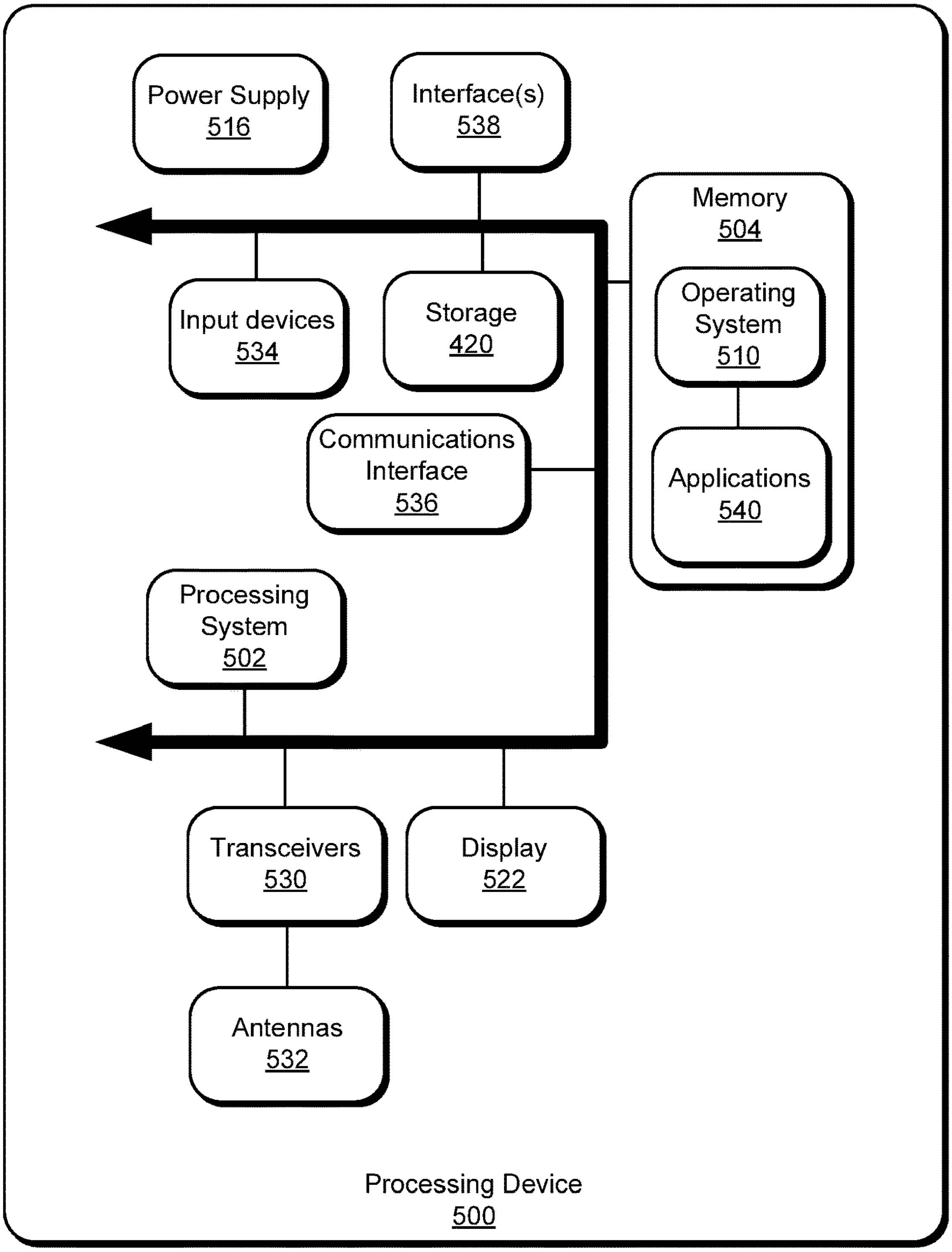
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes a processing system 502, memory 504, a display 522, and various input and/or output interfaces 508 (e.g., buttons). The processor unit(s) 502 may each include one or more CPUs, GPUs, etc. The memory 504 generally includes both volatile memory (e.g., RAM) and non-volatile memory (e.g., flash memory). An operating system 510, such as the Microsoft Windows® operating system or other operating system resides in the memory 504 and is executed by the processing system 502.

One or more applications 540 (e.g., the LLM context confiner 108 of FIG. 1 or any of its subcomponents) are loaded in the memory 504 and executed on the operating system 510 by the processing system 502. In some implementations, aspects of the LLM context confiner 108 of FIG. 1 are loaded into memory of different processing devices connected across a network. The applications 540 may receive inputs from one another as well as from various input local devices 534 such as a microphone, input accessory (e.g., keypad, mouse, stylus, touchpad, gamepad, racing wheel, joystick), and a camera.

Additionally, the applications 540 may receive input from one or more remote devices, such as remotely-located servers or smart devices, by communicating with such devices over a wired or wireless network using more communication transceivers 530 and an antenna 532 to provide network connectivity (e.g., a mobile phone network, Wi-Fi®, Bluetooth®). The processing device 500 may also include one or more storage devices 528 (e.g., non-volatile storage) for storing email templates, emails, user profile data, meeting summaries, etc. Other configurations may also be employed.

The processing device 500 further includes a power supply 516, which is powered by one or more batteries or other power sources and which provides power to other components of the processing device 500. The power supply 516 may also be connected to an external power source (not shown) that overrides or recharges the built-in batteries or other power sources.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

In some aspects, the techniques described herein relate to a method for using an LLM to generate a customized email. The email is created according to a methodology that reduces a risk of the LLM output including hallucinated facts or undesired personal identity information (PII). The method includes determining, based on user inputs to an email application, an email template and a recipient identifier that identifies a recipient of the customized email and mining contextual data stored in association with the recipient identifier, at least some of the which pertains to past communications between a sender of the customized email and a recipient identified by the recipient identifier. The method additionally includes generating an LLM prompt based on the email template and the contextual data, the LLM prompt requesting as output the customized email; providing the LLM prompt as input to a trained LLM receiving the customized email as an output from the LLM; and returning the customized email to the email application for display within a user interface.

In some aspects, the techniques described herein relate to a method, wherein the contextual data includes at least one of: entity profile data from a customer resource management application; previous email correspondence between a first user that initiated generation of the customized email and a second user associated with the recipient identifier; and meeting information including a meeting transcript or a meeting summary that references a past meeting between the first user and the second user.

In some aspects, the techniques described herein relate to a method, further including: identifying relevant contextual information from the contextual data associated with the recipient identifier, wherein the relevant contextual information includes information that is determined to be relevant to at least one of the email template and a sender of the customized email.

In some aspects, the techniques described herein relate to a method, wherein the LLM prompt includes the email template and the relevant contextual information.

In some aspects, the techniques described herein relate to a method, where the LLM prompt includes a natural language instruction instructing the trained LLM to generate the customized email based on the relevant contextual information using the email template.

In some aspects, the techniques described herein relate to a method, wherein the email template is an email previously drafted by a user that initiated generation of the customized email.

In some aspects, the techniques described herein relate to a method, further including: prior to generating the LLM prompt, identifying PII entities within the email template and replacing each of the PII entities with a placeholder naming a corresponding PII entity type.

In some aspects, the techniques described herein relate to a method, further including: executing scoring logic to assess relevance of various information items within the contextual data with respect to at least one of text within the email template and a sender identifier, the sender identifier identifying a user that initiated generation of the customized email from within the email application; and identifying relevant contextual information based on execution of the scoring logic, wherein the relevant contextual information is included within the LLM prompt.

In some aspects, the techniques described herein relate to a method, wherein mining the contextual data further includes accessing entity profiles stored within a customer resource management system.

In some aspects, the techniques described herein relate to a method, wherein mining the contextual data further includes accessing at least one of a meeting transcript or a meeting summary stored in association with the recipient identifier.

In some aspects, the techniques described herein relate to a system for using a trained large language model (LLM) to generate a customized email, the system including: memory; and an LLM context confiner stored in the memory that: receives, from an email application, an email template and a recipient identifier that identifies a recipient of the customized email; mines contextual data associated with the recipient identifier, at least some of the contextual data pertaining to past communications between a sender of the customized email and a recipient identified by the recipient identifier; generates a large language model (LLM) prompt based on the email template and the contextual data, the LLM prompt requesting as output the customized email; receives the customized email as an output from the LLM in response to providing the LLM with the LLM prompt; and returns the customized email to the email application.

In some aspects, the techniques described herein relate to a system, further including: an email application stored in the memory that: receives, from a user, selection of an email template and the recipient; and presents, on a display, the customized email within an email composition window of the email application.

In some aspects, the techniques described herein relate to a system, wherein the contextual data includes at least one of: entity profile data from a customer resource management application; previous email correspondence between a first user that initiated generation of the customized email and a second user associated with the recipient identifier; and meeting information including a meeting transcript or a meeting summary that references a past meeting between the first user and the second user.

In some aspects, the techniques described herein relate to a system, wherein the LLM context confiner is further executable to: execute scoring logic to identify relevant contextual information from the contextual data associated with the recipient identifier, wherein the relevant contextual information includes information that is determined to be relevant to at least one of the email template and a sender of the customized email.

In some aspects, the techniques described herein relate to a system, wherein the LLM prompt includes the email template and the relevant contextual information.

In some aspects, the techniques described herein relate to a system, where the LLM prompt includes a natural language instruction instructing the trained LLM to generate the customized email based on the relevant contextual information using the email template.

In some aspects, the techniques described herein relate to a system, wherein the email template is an email previously drafted by a user that initiated generation of the customized email.

In some aspects, the techniques described herein relate to a system, wherein the LLM context confiner is further configured to: identify PII entities within the email template and replace each of the PII entities with a placeholder naming a corresponding PII entity type prior to generating the LLM prompt.

In some aspects, the techniques described herein relate to one or more computer-readable storage media encoding processor-executable instructions for executing a computer process that uses a trained large language model (LLM) to generate a customized email according to a methodology that reduces a risk of the customized email including hallucinated facts and personal identity information (PII), the computer process including: receiving a selection of a email template and a recipient identifier that identifies a recipient of the customized email; mining contextual data associated with the recipient identifier, at least some of the contextual data pertaining to past communications between a sender of the customized email and a recipient identified by the recipient identifier; executing scoring logic to identify relevant contextual information from the contextual data associated with the recipient identifier, wherein the relevant contextual information includes information that is determined to be relevant to at least one of the email template and a sender of the customized email; generating a large language model (LLM) prompt that includes the email template and the relevant contextual information, the LLM prompt requesting as output the customized email; and presenting, on a user display, the customized email within an email composition window.

In some aspects, the techniques described herein relate to a computer process, further including: prior to generating the LLM prompt, identifying PII entities within the email template and replacing each of the PII entities with a placeholder naming a corresponding PII entity type.

In some aspects, the techniques described herein include system with a means for determining, based on user inputs to an email application, an email template and a recipient identifier that identifies a recipient of the customized email. The system further includes a means for mining contextual data stored in association with the recipient identifier, at least some of the which pertains to past communications between a sender of the customized email and a recipient identified by the recipient identifier. The system still further includes a means for generating an LLM prompt based on the email template and the contextual data, a means for providing the LLM prompt as input to a trained LLM, a means for receiving the customized email as an output from the LLM; and a means for returning the customized email to the email application for display within a user interface.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method for using a large language model (LLM) to generate a customized email that reduces a risk of the customized email including hallucinated facts or undesired personal identity information (PII), the method comprising:

determining, based on user inputs to an email application, an email template and a recipient identifier that identifies a recipient of the customized email;

mining contextual data stored in association with the recipient identifier, at least some of the contextual data pertaining to past communications between a sender of the customized email and a recipient identified by the recipient identifier;

generating a large language model (LLM) prompt that includes the email template and the contextual data, the LLM prompt requesting as output the customized email;

providing the LLM prompt as input to a trained large language model (LLM);

receiving the customized email as an output from the LLM; and returning the customized email to the email application for display within a user interface.

2. The method of claim 1, wherein the contextual data includes at least one of:

entity profile data from a customer resource management application;

previous email correspondence between a first user that initiated generation of the customized email and a second user associated with the recipient identifier; or meeting information including a meeting transcript or a meeting summary that references a past meeting between the first user and the second user.

3. The method of claim 1, further comprising:

identifying relevant contextual information from the contextual data associated with the recipient identifier, wherein the relevant contextual information comprises information that is determined to be relevant to at least one of the email template and a sender of the customized email.

4. The method of claim 3, wherein the LLM prompt includes the email template and the relevant contextual information.

5. The method of claim 3, where the LLM prompt includes a natural language instruction instructing the trained LLM to generate the customized email based on the relevant contextual information using the email template.

6. The method of claim 1, wherein the email template is an email previously drafted by a user that initiated generation of the customized email.

7. The method of claim 6, further comprising:

prior to generating the LLM prompt, identifying PII entities within the email template and replacing each of the PII entities with a placeholder naming a corresponding PII entity type.

8. The method of claim 1, further comprising:

executing scoring logic to assess relevance of various information items within the contextual data with respect to at least one of text within the email template and a sender identifier, the sender identifier identifying a user that initiated generation of the customized email from within the email application; and identifying relevant contextual information based on execution of the scoring logic, wherein the relevant contextual information is included within the LLM prompt.

9. The method of claim 1, wherein mining the contextual data further comprises accessing entity profiles stored within a customer resource management system.

10. The method of claim 1, wherein mining the contextual data further comprises accessing at least one of a meeting transcript or a meeting summary stored in association with the recipient identifier.

11. A system for using a trained large language model (LLM) to generate a customized email, the system comprising:

memory; and an LLM context confiner stored in the memory that:

receives, from an email application, an email template and a recipient identifier that identifies a recipient of the customized email;

mines contextual data associated with the recipient identifier, at least some of the contextual data pertaining to past communications between a sender of the customized email and a recipient identified by the recipient identifier;

generates a large language model (LLM) prompt that includes based on the email template and the contextual data, the LLM prompt requesting as output the customized email;

receives the customized email as an output from the LLM in response to providing the LLM with the LLM prompt; and returns the customized email to the email application.

12. The system of claim 11, further comprising:

an email application stored in the memory that:

receives, from a user, selection of an email template and the recipient; and presents, on a display, the customized email within an email composition window of the email application.

13. The system of claim 11, wherein the contextual data includes at least one of:

entity profile data from a customer resource management application;

previous email correspondence between a first user that initiated generation of the customized email and a second user associated with the recipient identifier; and meeting information including a meeting transcript or a meeting summary that references a past meeting between the first user and the second user.

14. The system of claim 11, wherein the LLM context confiner is further executable to:

execute scoring logic to identify relevant contextual information from the contextual data associated with the recipient identifier, wherein the relevant contextual information comprises information that is determined to be relevant to at least one of the email template and a sender of the customized email.

15. The system of claim 14, wherein the LLM prompt includes the email template and the relevant contextual information.

16. The system of claim 14, where the LLM prompt includes a natural language instruction instructing the trained LLM to generate the customized email based on the relevant contextual information using the email template.

17. The system of claim 11, wherein the email template is an email previously drafted by a user that initiated generation of the customized email.

18. The system of claim 17, wherein the LLM context confiner is further configured to:

identify PII entities within the email template and replace each of the PII entities with a placeholder naming a corresponding PII entity type prior to generating the LLM prompt.

19. One or more computer-readable storage media encoding processor-executable instructions for executing a computer process that uses a trained large language model (LLM) to generate a customized email according to a methodology that reduces a risk of the customized email including hallucinated facts and personal identity information (PII), the computer process comprising:

receiving a selection of a email template and a recipient identifier that identifies a recipient of the customized email;

mining contextual data associated with the recipient identifier, at least some of the contextual data pertaining to past communications between a sender of the customized email and a recipient identified by the recipient identifier;

executing scoring logic to identify relevant contextual information from the contextual data associated with the recipient identifier, wherein the relevant contextual information comprises information that is determined to be relevant to at least one of the email template and a sender of the customized email;

generating a large language model (LLM) prompt that includes the email template and the relevant contextual information, the LLM prompt requesting as output the customized email; and presenting, on a user display, the customized email within an email composition window.

20. The computer process of claim 19, further comprising: prior to generating the LLM prompt, identifying PII entities within the email template and replacing each of the PII entities with a placeholder naming a corresponding PII entity type.

* * * * *